(12) United States Patent
Park et al.

(10) Patent No.: US 8,119,700 B2
(45) Date of Patent: Feb. 21, 2012

(54) ORGANIC AEROGEL, COMPOSITION FOR FORMING THE SAME, AND METHOD OF PREPARING THE SAME

(75) Inventors: Sang-Ho Park, Yongin-si (KR); Myung-Dung Cho, Hwaseong-si (KR); Kwang-Hee Kim, Seoul (KR); Sung-Woo Hwang, Daejeon-si (KR)

(73) Assignee: Samsung Electronics Co., Ltd. (KR)

( * ) Notice: Subject to any disclaimer, the term of this patent is extended or adjusted under 35 U.S.C. 154(b) by 282 days.

(21) Appl. No.: 12/553,248

(22) Filed: Sep. 3, 2009

(65) Prior Publication Data

US 2010/0204347 A1 Aug. 12, 2010

(30) Foreign Application Priority Data

Feb. 11, 2009 (KR) .................. 10-2009-0010967

(51) Int. Cl.
 *C09K 3/00* (2006.01)
 *C08J 9/28* (2006.01)
 *B01J 13/00* (2006.01)

(52) U.S. Cl. .............. 521/61; 521/63; 521/64; 521/180; 521/181; 521/187; 528/254

(58) Field of Classification Search .................... 521/61, 521/63, 64, 180, 181, 187; 628/254; 528/254
See application file for complete search history.

(56) References Cited

U.S. PATENT DOCUMENTS

| | | | |
|---|---|---|---|
| 3,549,481 A * | 12/1970 | Loeble, Jr. et al. ........... 428/393 |
| 4,873,218 A | 10/1989 | Pekala | |
| 4,966,919 A | 10/1990 | Williams, Jr. et al. | |
| 4,997,804 A | 3/1991 | Pekala | |
| 5,124,364 A | 6/1992 | Wolff et al. | |
| 5,137,927 A | 8/1992 | Wolff et al. | |
| 5,159,049 A | 10/1992 | Allen | |
| 5,420,168 A | 5/1995 | Mayer et al. | |
| 5,484,818 A | 1/1996 | De Vos et al. | |
| 5,508,341 A | 4/1996 | Mayer et al. | |
| 5,945,084 A | 8/1999 | Droege | |
| 5,948,879 A | 9/1999 | Mori et al. | |
| 6,040,375 A | 3/2000 | Behme et al. | |
| 6,316,092 B1 | 11/2001 | Frank et al. | |
| 6,887,563 B2 | 5/2005 | Frank et al. | |
| 7,118,801 B2 | 10/2006 | Ristic-Lehmann et al. | |
| 7,282,466 B2 | 10/2007 | Long et al. | |
| 7,316,919 B2 | 1/2008 | Childs et al. | |
| 2001/0038933 A1 | 11/2001 | Gebhardt et al. | |
| 2002/0173554 A1 | 11/2002 | Baumann et al. | |
| 2004/0142149 A1 | 7/2004 | Mollendorf et al. | |
| 2005/0131089 A1 | 6/2005 | Kocon et al. | |
| 2007/0036959 A1 | 2/2007 | Yamoto et al. | |
| 2007/0087120 A1 | 4/2007 | Connors, Jr. et al. | |
| 2007/0167534 A1 | 7/2007 | Coronado et al. | |
| 2007/0259169 A1 | 11/2007 | Williams et al. | |
| 2008/0087870 A1 | 4/2008 | Williams et al. | |
| 2008/0220333 A1 | 9/2008 | Yano et al. | |
| 2008/0287561 A1 | 11/2008 | Menashi et al. | |
| 2009/0029147 A1 | 1/2009 | Tang et al. | |
| 2009/0035344 A1 | 2/2009 | Thomas et al. | |

FOREIGN PATENT DOCUMENTS

| | | |
|---|---|---|
| DE | 1964188 A1 | 7/1970 |
| EP | 0994912 A | 1/1994 |
| JP | 4732742 | 11/1972 |
| JP | 05-319899 A | 12/1993 |
| JP | 2000-19433 A | 4/2000 |
| JP | 2008132676 A | 6/2008 |
| JP | 2008221385 A | 9/2008 |
| JP | 2008231258 A | 10/2008 |
| KR | 19967003975 A | 8/1996 |
| KR | 10-0282964 A | 12/2000 |
| KR | 1020010017538 A | 3/2001 |
| KR | 1020040011915 A | 2/2004 |
| KR | 1020040106289 A | 12/2004 |
| KR | 1020050037557 A | 4/2005 |
| KR | 1020050073500 A | 7/2005 |
| KR | 1020050118119 A | 12/2005 |
| KR | 1020060099514 A | 9/2006 |
| KR | 1020090059321 A | 6/2009 |
| KR | 10-0911845 B | 8/2009 |
| WO | 96/26915 A1 | 9/1996 |
| WO | 2009033070 A1 | 3/2009 |

OTHER PUBLICATIONS

Iler, R.K., 1978. "The Chemistry of Silica", John Wiley & Sons, New York.
Leventis, N., "Three-Dimensional Core-Shell Superstructures: Mechanically Strong Aerogels", Acc. Chem. Res. 2007, 2007, 40 (9), pp. 874-884.
Pekala, R. W. et al., "Structure of organic aerogels 1. Morphology and scaling", Macromolecules 26 (1993), pp. 5487-5493.
Aaltonen, O. et al., The preparation of lignocellulosic aerogels from ionic liquid solutions, Carbohydrate Polymers, 2009, vol. 75: 125-129.
Al-Muhtaseb, S.A. et al., Preparation and Properties of Resorcinol—Formaldehyde Organic and Carbon Gels, Advanced Materials, 15, 101-114 (2003).
Aoki, H. et al., Basic Study of the Gelation of Dimethacrylate-Type Crosslinking Agents, J. of Polymer Sci Part A: Polymer Chem, 2006, 44: 949-958.
Capadona, L. A. et al., Flexible, Low-Density Polymer Crosslinked Silica Aerogels. Polymer, 2006; vol. 47: 5754-5761.
Chowdhury, R., Electron-Beam-Induced Crosslinking of Natural Rubber/Acrylonitril—Butadiene Rubber Latex Blends in the Presence of Ethoxylated Pentaerythritol Tetraacrylate Used as a Crosslinking Promoter, J. of Applied Polymer Sci, 2007, vol. 103 (2): 1206-1214.
EP Search Report for Application No. 11158144.3 dated Jul. 29, 2011.
Feldmann C., "Polyol-Medicated Synthesis of Nanoscale Functional Materials", Advanced Functional Materials, 2003, vol. 13(2): 101-107.

(Continued)

Primary Examiner — Irina S Zemel
(74) Attorney, Agent, or Firm — Cantor Colburn LLP

(57) ABSTRACT

Disclosed is an organic aerogel including a polymer obtained from reaction an aryl alcohol compound, an aldehyde compound, and a polyol compound, a composition for forming the same, and a method of preparing the same.

17 Claims, 14 Drawing Sheets

OTHER PUBLICATIONS

Fischer, F. et al., Cellulose-based aerogels, Polymer, 2006, vol. 47: 7636-7645.

Gavillon, R. et al., Aerocellulose: New Highly Porous Cellulose Prepared from Cellulose—NaOH Aqueous Solutions, Biomacromolecules, 2008, vol. 9: 269-277.

Gu, W. et al., Polymerized Gels and everse Aerogels from Methyl Methacrylate or Styrene and Tetraoctadecylammonium Bromide as Gelator, Chem. Commun. 1997, 6, pp. 543-544.

Hebb, A. et al., Synthesis of porous cross-linked polymer monoliths using 1,1,1,2-tetrafluoroethane (R134a) as the porogen, Composites Science and Technology, 2003, vol. 63: 2379-2387.

Hoepfner, S. et al., Synthesis and characterisation of nanofibrillar cellulose aerogels, Cellulose, 2008, vol. 15: 121-129.

Husing, N. et al., "Aerogels—Airy Materials: Chemistry, Structure, and Properties", Angew. Chem. Int. Ed., 1998, vol. 37: 22-45.

Innerlohinger, J. et al., Aerocellulose: Aerogels and Aerogel-like Materials made from Cellulose, Macromol. Symp., 2006, vol. 244: 126-135.

Jin, H. et al., Nanofibrillar cellulose aerogels, Colloids and Surfaces A: Physicochem. Eng. Aspects, 2004, vol. 240 (1-3): 63-67.

Jirglova, H. et al., Synthesis and Properties of Phloroglucinol-Phenol-Formaldehyde Carbon Aerogels and Xerogels, Langmuir, 2009; 25(4): 2461-2466.

Kaczmarek, H. et al., Networks of Photocrosslinked Poly(meth)acrylates in Linear Poly(vinyl chloride), Networks of , J. Appl. Polym. Sci., 2002, 86, 375-3734.

Kanamori, K. et al., New Transparent Methylsilsesquioxane Aerogels and Xerogels with Improved Mechanical Properties, Advanced Materials, 2007, vol. 19(12): 1589-1593.

Katanyoota, P. et al., Novel polybenzoxazine-based carbon aerogel electrode for supercapacitors, Materials Science and Engineering: B, 2010, vol. 167(1): 36-42.

Leventis, N., Three-Dimensional Core-Shell Superstructures: Mechanically Strong Aerogels, Acc. Chem. Res. 2007, 40 (9): 874-884.

Leventis, N. et al., Nanoengineering Strong Silica Aerogels, Nano Letters, 2002, vol. 2 (9): 957-960.

Liebner, F. et al., Cellulose aerogels: highly porous, ultra-lightweight materials, Holzforschung, 2008, vol. 62: 129-135.

Liebner, F. et al., Cellulosic aerogels as ultra-lightweight materials. Part 2: synthesis and properties, Holzforschung, 2009, vol. 63: 3-11.

Long, D. et al. "Molecular design of polymer precursors for controlling microstructure of organic and carbon aerogels", Journal of Non-Crystalline Solids, 2009,: vol. 355(22-23): 1252-1258.

Lorjai, P. et al., "Porous Structure of Polybenzoxazine-based organic aerogel prepared by sol-gel process and their carbon aerogels", J Sol-Gel Sci Technol, 2009, vol. 52(1): 56-64.

Mulik, S. et al, Cross-Linking 3D Assemblies of Nanoparticles into Mechanically Strong Aerogels by Surface-Initiated Free-Radical Polymerization, Chem. Mater., 2008, 20 (15): 5035-5046.

Paguio, R.R. et al., Fabrication Capabilities for Spherical Foam Targets Used in ICF Experiments,17th Target Fabrication Specialist Meeting, San Diego, CA, Oct. 1-5, 2006. Also published on IEEE Xplore.

Pekala, R.W. "Organic aerogels from the polycondensation of resorcinol with formaldehyde", Journal of Materials Science, 1989, 24(9): 3221-3227.

Rozenberg, B.A. et al., "High-performance Bismaleimide Matrices: Cure Kinetics and Mechanism" Polymers for Advanced Technologies, 2002, vol. 13 (10-12): 837-844.

Science Magazine, Editor's Choice Section, "Materials Science Spongy Clay?", Oct. 21, 2005, vol. 310; 5747: 407c.

Tan, C. et al., Organic Aerogels with Very High Impact Strength, Advanced Materials, 2001, vol. 13 (9): 644-646.

Wiener, M. et al., "Carbon Aerogel-Based High-Temperature Thermal Insulation", Int J. Thermophys, 2009, vol. 30 (4):1372-1385.

* cited by examiner

ORGANIC AEROGEL, COMPOSITION FOR FORMING THE SAME, AND METHOD OF PREPARING THE SAME

CROSS-REFERENCE TO RELATED APPLICATION

This application claims priority to Korean Patent Application No. 10-2009-0010967 filed in the Korean Intellectual Property Office on Feb. 11, 2009, and all the benefits accruing therefrom under 35 U.S.C. §119, the entire content of which in its entirety is herein incorporated by reference.

BACKGROUND (1) Field

This disclosure relates to an organic aerogel, a composition for forming the same, and a method of preparing the same.

(2) Description of the Related Art

An aerogel is a mesoporous material having a nanometer-sized three-dimensional network structure. Based on their adiabatic properties and sound absorption properties, aerogels may be utilized in diverse areas. Particularly, an aerogel may be used in a cooling device such as a refrigerator and a freezer, as an adiabatic material for the aerospace industry and as an adiabatic material for building construction.

Aerogels may be classified as an inorganic aerogel or an organic aerogel according to the material. An example of an inorganic aerogel is a silica aerogel. An organic aerogel is an organic compound with an organic linking group. Organic aerogels are more flexible than inorganic aerogels, but the extent of improvement in the flexibility is subtle.

SUMMARY

One embodiment of the disclosure provides an organic aerogel with improved flexibility and mechanical strength so that a large-scale aerogel product may be fabricated.

Another embodiment of the disclosure provides a composition for forming the organic aerogel.

A further embodiment of the disclosure provides a method of preparing the organic aerogel.

According to one embodiment of the disclosure, an organic aerogel including a polymer obtained from an aryl alcohol compound, an aldehyde compound, and a polyol compound is provided.

The polymer may include a structural unit represented by the following Chemical Formula 1.

   Chemical Formula 1

In the above Chemical Formula 1,

R is selected from the group consisting of a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene.

A is hydrogen, and/or a structural unit represented by the following Chemical Formula 2, provided that each A is the same or different, and that at least one A is not hydrogen, and n is an integer ranging from 2 to 10.

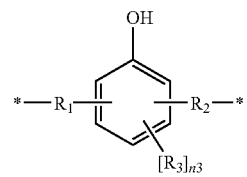   Chemical Formula 2

In the above Chemical Formula 2, $R_1$ and $R_2$ are independently selected from the group consisting of hydrogen, a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, $R_3$ is selected from the group consisting of hydrogen, a hydroxy, a substituted or unsubstituted alkoxy, and a substituted or unsubstituted amino, and n3 is an integer ranging from 0 to 3.

The polyol compound may be represented by the following Chemical Formula 3.

   Chemical Formula 3

In the above Chemical Formula 3, $R_9$ is selected from the group consisting of a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, and n9 is an integer ranging from 2 to 10.

The polymer may further include a structural unit represented by the following Chemical Formula 13.

   Chemical Formula 13

In the above Chemical Formula 13, $R_4$ is selected from the group consisting of a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, B is hydrogen, and/or a structural unit represented by the following Chemical Formula 14, provided that each B is the same or different, and that at least one B is not hydrogen, and n4 is an integer ranging from 2 to 4.

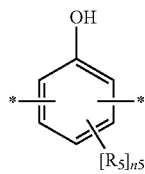

Chemical Formula 14

In the above Chemical Formula 14, $R_5$ is selected from the group consisting of hydrogen, a hydroxy, a substituted or unsubstituted alkoxy, and a substituted or unsubstituted amino, and n5 is an integer ranging from 0 to 3.

The polymer may further include a structural unit represented by the following Chemical Formula 16.

Chemical Formula 16

In the above Chemical Formula 16,

D is hydrogen, and/or a structural unit represented by the following Chemical Formula 17, provided that each D is the same or different, and that at least one D is not hydrogen, and n6 is an integer of 2.

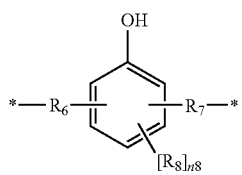

Chemical Formula 17

In the above Chemical Formula 17, $R_6$ and $R_7$ are independently selected from the group consisting of hydrogen, a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, $R_8$ is selected from the group consisting of hydrogen, a hydroxy, a substituted or unsubstituted alkoxy, and a substituted or unsubstituted amino, and n8 is an integer ranging from 0 to 3.

The polyol compound may be included in an amount of about 0.05 wt % to about 30 wt % based on the summed weight of the aryl alcohol compound, the aldehyde compound, and the polyol compound.

According to another aspect of the disclosure, a composition for forming an organic aerogel including an aryl alcohol compound, an aldehyde compound, and a polyol compound is provided.

The polyol compound may be represented by the above Chemical Formula 3.

The polyol compound may be included in an amount of about 0.05 wt % to about 30 wt % based on the summed weight of the aryl alcohol compound, the aldehyde compound, and the polyol compound.

According to further another aspect of the disclosure, a method of preparing an organic aerogel is provided. The method includes mixing an aryl alcohol compound, an aldehyde compound, and a polyol compound to make a wet gel, and drying the wet gel.

The polyol compound may be represented by the above Chemical Formula 3.

The wet gel may be prepared using a sol-gel process.

The wet gel may be dried using a method including a solvent exchange process.

The wet gel may be dried by at least one method selected from the group consisting of supercritical drying, atmospheric pressure drying, lyophilizing drying, and lyophilizing reduced pressure drying.

Hereinafter, further aspects of the present invention will be described in detail.

DETAILED DESCRIPTION

Figure 1A:
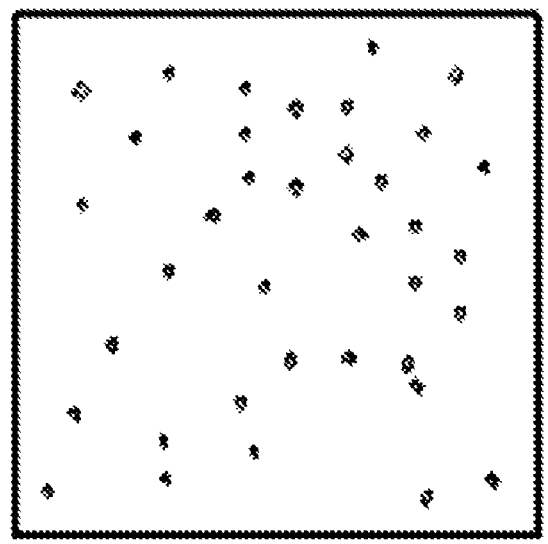
FIGS. 1A to 1C are schematic views showing an exemplary embodiment of how an organic aerogel is formed through a sol-gel process.

Exemplary embodiments of the disclosure will be described more fully hereinafter with reference to the accompanying drawings. The present invention may, however, be embodied in many different forms and should not be construed as limited to the exemplary embodiments set forth herein. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, when specific definition is not provided, the terms "alkylene", "alkenylene", "alkynylene", "cycloalkylene", "cycloalkenylene", "cycloalkynylene", "heterocycloalkylene", "heterocycloalkenylene", "heterocycloalkynylene", "arylene," and "heteroarylene" refer to a C1 to C10 alkylene, a C2 to C10 alkenylene, a C2 to C10 alkynylene, a C3 to C10 cycloalkylene, a C3 to C10 cycloalkenylene, a C3 to C10 cycloalkynylene, a C2 to C10 heterocycloalkylene, a C2 to C10 heterocycloalkenylene, a C2 to C10 heterocycloalkynylene, a C6 to C20 arylene, and a C2 to C20 heteroarylene, respectively.

As used herein, when specific definition is not provided, the term "alkoxy" refers to a C1 to C10 alkoxy.

As used herein, when specific definition is not provided, the terms "heterocycloalkylene", "heterocycloalkenylene", "heterocycloalkynylene," and "heteroarylene" refer to compounds containing at least one heteroatom selected from the group consisting of N, O, S, and P instead of at least one carbon in cycloalkylene, cycloalkenylene, cycloalkynylene, and arylene rings.

As used herein, when specific definition is not provided, the term "substituted" refers to substitution with at least a substituent selected from the group consisting of a C1 to C10 alkoxy, a carboxyl, a C1 to C10 alkyl, a C2 to C10 alkenyl, a C2 to C10 alkynyl, a C3 to C10 cycloalkyl, a C3 to C10 cycloalkenyl, a C3 to C10 cycloalkynyl, a C2 to C10 heterocycloalkyl, a C2 to C10 heterocycloalkenyl, a C2 to C10 heterocycloalkynyl, a C6 to C20 aryl, and a C2 to C20 heteroaryl.

As used herein, when specific definition is not provided, the term "ether" refers to R'OR" where R' and R" are independently selected from the group consisting of an alkyl, a cycloalkyl, a heterocycloalkyl, an aryl, and a heteroaryl.

As used herein, when specific definition is not provided, the term "amino" refers to NR'R" where R' and R" are independently selected from the group consisting of an alkyl, a cycloalkyl, a heterocycloalkyl, an aryl, and a heteroaryl.

As used herein, when specific definition is not provided, the term "structural unit" refers to a unit present in at least one part of a polymer as well as a repeating unit to be linked repeatedly.

As used herein, when specific definition is not provided, the term "polyol compound" refers to a compound including at least two hydroxy groups.

As used herein, the terms "a" and "an" are open terms that may be used in conjunction with singular items or with plural items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes one or more of the listed items in any and all combinations.

As used herein, when specific definition is not provided, the terms "mesoporous material", "mesopores", and "mesostructure" refer to a material containing pores with diameters between about 2 nm and about 50 nm.

The organic aerogel according to one embodiment of the disclosure includes a polymer obtained from an aryl alcohol compound, an aldehyde compound, and a polyol compound.

The polymer includes may include a structural unit represented by the following Chemical Formula 1.

   Chemical Formula 1

In the above Chemical Formula 1,

R is selected from the group consisting of a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, A is hydrogen, and/or a structural unit represented by the following Chemical Formula 2, provided that each A is the same or different, and at least one A is not hydrogen, and n is an integer ranging from 2 to 10.

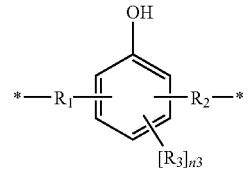   Chemical Formula 2

In the above Chemical Formula 2, $R_1$ and $R_2$ are independently selected from the group consisting of hydrogen, a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, $R_3$ is selected from the group consisting of hydrogen, a hydroxy, a substituted or unsubstituted alkoxy, and a substituted or unsubstituted amino, and n3 is an integer ranging from 0 to 3.

In the structural unit represented by the Chemical Formula 1, R—O is derived from a polyol compound. The polyol compound is a compound having more than two hydroxy groups, and it may be represented by the following Chemical Formula 3.

   Chemical Formula 3

In the above Chemical Formula 3, $R_9$ is selected from the group consisting of a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, and n9 is an integer ranging from 2 to 10.

In the above Chemical Formula 3, the hydroxy groups are linked to one or more carbon atoms of $R_9$. The hydroxy groups can be linked to the same or different carbon atoms.

For example, the polyol compound may be represented by the following Chemical Formula 4.

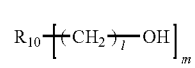   Chemical Formula 4

In the above Chemical Formula 4, $R_{10}$ is selected from the group consisting of a substituted or unsubstituted alkyl, a substituted or unsubstituted ether, a substituted or unsubstituted cycloalkyl, a substituted or unsubstituted aryl, and isocyanurate, l is an integer ranging from 0 to 10, and m is an integer ranging from 2 to 10.

Non-limiting examples of the polyol compound may be represented by the following Chemical Formulae 5 to 11.

Chemical Formula 5
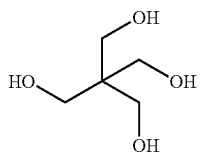

Chemical Formula 6
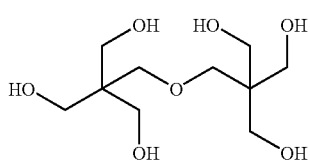

Chemical Formula 7
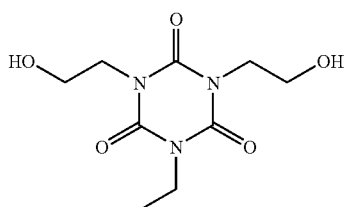

Chemical Formula 8
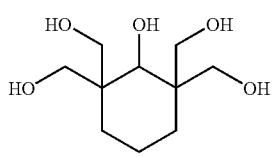

Chemical Formula 9
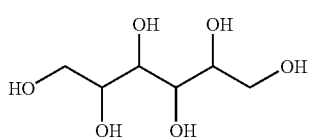

Chemical Formula 10
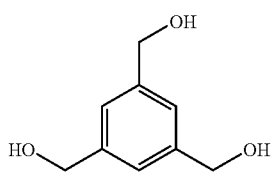

Chemical Formula 11
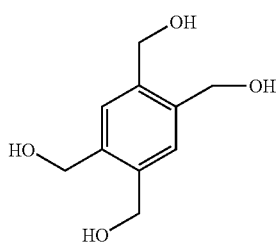

The structural unit represented by the Chemical Formula 1 derived from the polyol compound, the aryl alcohol compound, and the aldehyde compound, which are described herein, may be represented by the following Chemical Formula 12.

Chemical Formula 12
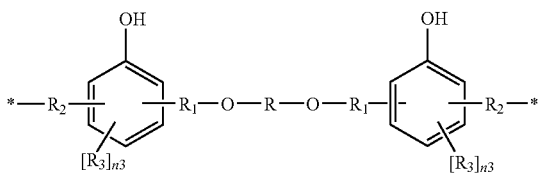

In the above Chemical Formula 12,
R, $R_1$, $R_2$, $R_3$, and n3 are the same as defined in the above Chemical Formulas 1 and 2.

The structural unit represented by the Chemical Formula 12 shows a case where n of Chemical Formula 1 is 2. As shown in Chemical Formula 12, according to an embodiment of the present invention, excellent mechanical strength and flexibility are acquired by introducing a new linking group between aryl compounds.

The structural unit represented by the above Chemical Formula 1 may be formed by mixing an aryl alcohol compound, an aldehyde compound, and a polyol compound with a catalyst. The structural unit represented by the above Chemical Formula 1 may be formed through diverse reaction routes. A non-limiting example of the reaction routes will be described hereafter through the following Reaction Schemes 1 and 2.

Without being bound by theory, the following Reaction Scheme 1 shows how an exemplary structural unit represented by the Chemical Formula 1 is formed in the presence of an acid catalyst. Again without being bound by theory, the following Reaction Scheme 2 shows how an exemplary structural unit represented by the Chemical Formula 1 is formed in the presence of a base and an acid catalyst.

Reaction Scheme 1

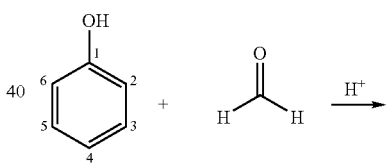

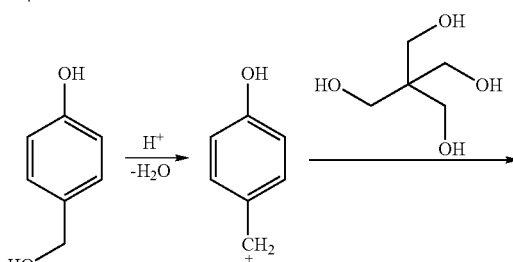

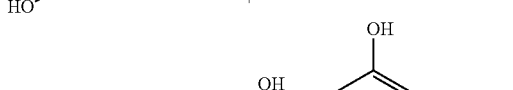

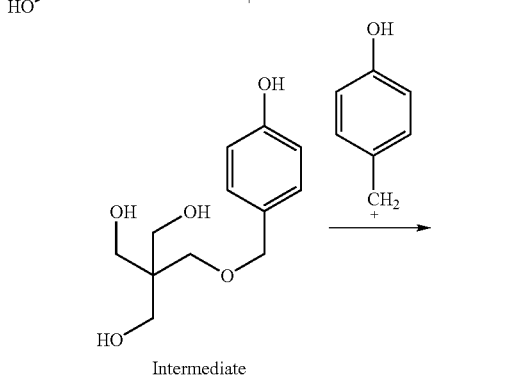

Intermediate

-continued

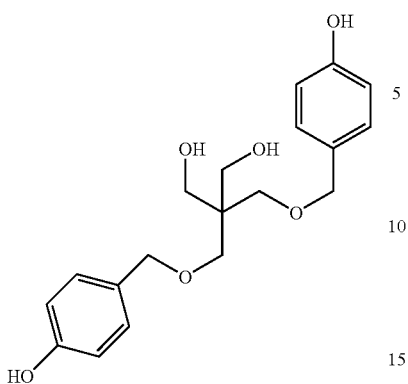

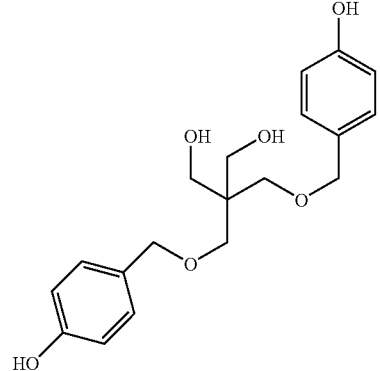

Reaction Scheme 2

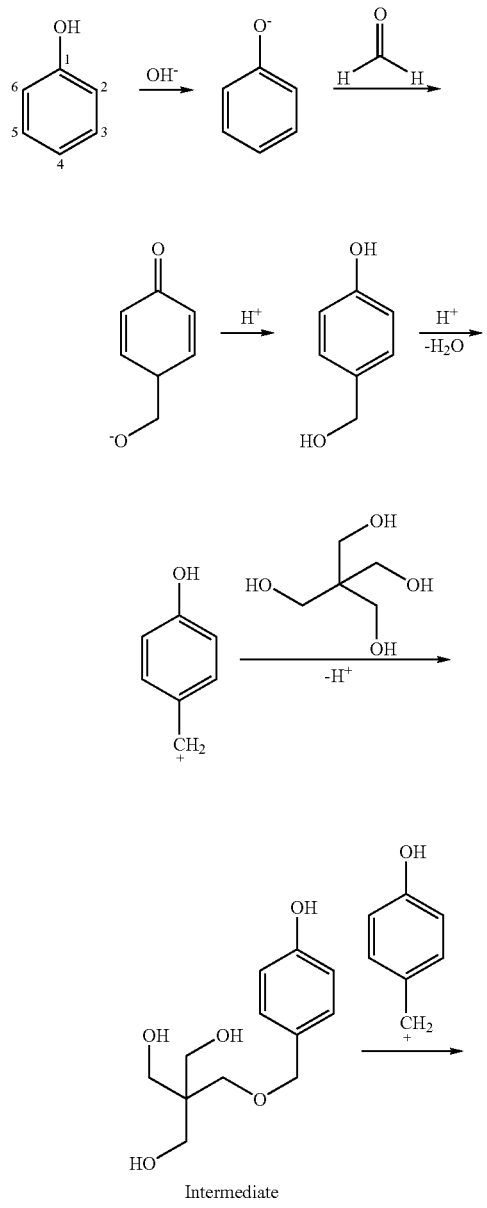

Reaction Schemes 1 and 2 exemplarily show how the structural unit represented by the Chemical Formula 1 is formed according to embodiments of the disclosure. The reaction route, the reactants (which are an aryl alcohol compound, an aldehyde compound, and a polyol compound), an intermediate compound, and a product, which is the structural unit represented by Chemical Formula 1, do not limit the scope of the disclosure.

Referring to Reaction Schemes 1 and 2, in the first step, an aryl alcohol compound is reacted with an aldehyde compound in the presence of an acid catalyst or a base and an acid catalyst. It is believed that the reaction is a hydroxymethylation reaction caused by an electrophilic substitution reaction. The hydroxy group of the aryl alcohol compound, which is a reactant, functions as a directing group that increases the electron density of 2- and 6 carbons of an aromatic carbocyclic to thereby increase regioselectivity of the reaction.

In the second step, it is believed that the hydroxy group linked to a benzylic carbon created in the reaction of the first step is activated to become water ($H_2O$), thereby forming a benzylic carbocation. It is believed that the benzylic carbocation functions as an electrophile and reacts with a hydroxy group of the polyol compound to thereby produce the intermediate compound.

In the third step, the product, which is a structural unit of a polymer, is believed to be formed as one hydroxy group of the intermediate compound reacts with another benzylic carbocation. This reaction continues to form an organic aerogel polymer.

The organic aerogel polymer according to an embodiment of the disclosure may include a structural unit such as the product, as well as other structural units formed as the reaction proceeds. For example, more than one hydroxy group of the aryl compounds in the structural unit can react with a carbocation of another benzylic position. Also, a structural unit such as the intermediate compound may be included in the polymer structure.

In short, according to the embodiment of the disclosure, the structural unit represented by the Chemical Formula 1 may be a structural unit formed when a portion of the more than two hydroxy groups existing in the polyol compound reacts with the carbocation of the benzylic position, or a structural unit formed when all of the more than two hydroxy groups participate in the reaction.

The reaction occurs continuously to thereby form a three-dimensional network structure, and a sol-gel procedure is performed based on the reaction to thereby form an organic aerogel.

The structural unit prepared according to an example of the reaction route and represented by the Chemical Formula 1 may have improved flexibility and mechanical strength due to the presence of a new linking group generated between the polyol compound and the aryl compounds. The flexibility and the mechanical strength may be controlled according to the type of the polyol compound.

The organic aerogel polymer according to an embodiment may include an alternative structural unit in addition to the structural unit represented by the Chemical Formula 1. This structural unit is formed in the reaction mixture in the absence of a reaction with the polyol compound. The structural unit may be represented by the following Chemical Formulae 13 and 16.

  Chemical Formula 13

In the above Chemical Formula 13, $R_4$ is selected from the group consisting of a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, B is hydrogen, and/or a structural unit represented by the following Chemical Formula 14, provided that each B is the same or different, and that at least one B is not hydrogen, and n4 is an integer ranging from 2 to 4.

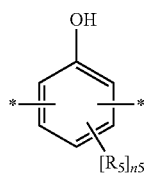  Chemical Formula 14

In the above Chemical Formula 14, $R_5$ is selected from the group consisting of hydrogen, a hydroxy, a substituted or unsubstituted alkoxy, and a substituted or unsubstituted amino, and n5 is an integer ranging from 0 to 3.

A non-limiting example of the structural unit represented by the Chemical Formula 13 is the following Chemical Formula 15.

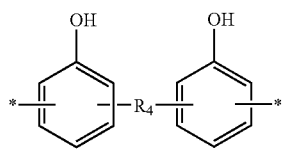  Chemical Formula 15

In the above Chemical Formula 15, $R_4$ is the same as defined in the above Formula 13.

The structural unit represented by the Chemical Formula 15 is and example of the structural unit represented by the Chemical Formula 13 where n4 is 2. The organic aerogel polymer may include a structural unit with the linking group between aryl compounds.

Also, the organic aerogel polymer may further include a structural unit represented by the following Chemical Formula 16 in addition to the structural unit represented by the Chemical Formula 1.

  Chemical Formula 16

In the above Chemical Formula 16,

D is hydrogen, and/or a structural unit represented by the following Chemical Formula 17, provided that each D is the same or different, and that at least one D is not hydrogen, and n6 is 2.

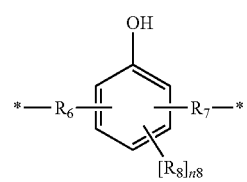  Chemical Formula 17

In the above Chemical Formula 17, $R_6$ and $R_7$ are independently selected from the group consisting of hydrogen, a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, $R_8$ is selected from the group consisting of hydrogen, a hydroxy, a substituted or unsubstituted alkoxy, and a substituted or unsubstituted amino, and n8 is an integer ranging from 0 to 3.

A non-limiting example of the structural unit represented by the Chemical Formula 16 may be represented by the following Chemical Formula 18.

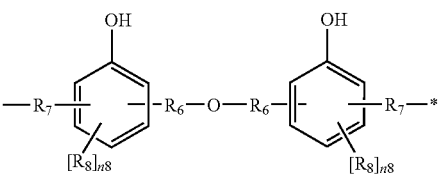  Chemical Formula 18

In the above Chemical Formula 18, $R_6$, $R_7$, $R_8$, and n8 are the same as in the above Chemical Formula 17.

The structural unit represented by the Chemical Formula 18 shows a non-limiting example of the structural unit represented by the Chemical Formula 16. The organic aerogel polymer may include a structural unit with the linking group between aryl compounds.

Another embodiment of the present invention provides a composition for forming the organic aerogel polymer.

The composition includes an aryl alcohol compound, an aldehyde compound, and the aforementioned polyol compound.

The aryl alcohol compound may include one selected from the group consisting of resorcinol, phenol, cresol, catechol, and combinations thereof.

As for the aldehyde compound, water-soluble aldehyde compounds, such as formaldehyde and furaldehyde, may be used in the presence of a base catalyst using water. In the presence of an acid catalyst using an organic solvent, many different aldehyde compounds may be used without limitation.

An organic aerogel polymer including the structural unit represented by the Chemical Formula 1 may be formed using the composition.

The organic aerogel has a specific surface area ranging from about 250 m$^2$/g to about 800 m$^2$/g, porosity ranging from about 80 vol % to about 99 vol %, a pore size ranging from about 1 nm to about 50 nm, and density ranging from about 0.003 g/cm$^3$ to about 0.35 g/cm$^3$. The organic aerogel polymer having the above properties may have excellent mechanical strength and flexibility. In addition, the organic aerogel has a low heat conductivity that can be about 24 mW/m·K or less, in another embodiment, about 12 to about 24 mW/m·K.

Because the organic aerogel has a mesostructure forming branch-shaped clusters where globular particles having a size of about 2 nm to about 5 nm are combined with each other, it has high structural strength. The cluster forms a porous structure having small pores in a three-dimensional network shape such as fractal. The average size and density of the pores may be controlled during the fabrication process.

Since carbon absorbs radiated infrared rays, which otherwise cause heat transmission, the organic aerogel can effectively block out the radiation, which is one of the heat transmission methods. In short, the organic aerogel has excellent adiabatic properties. Also, the organic aerogel may be used as a dehumidifier due to its hygroscopicity.

The organic aerogel itself may be hydrophilic, and in this case, it may be made hydrophobic through a chemical treatment. The chemical treatment may be explained with a modification of phenol moiety in the organic aerogel polymer, such as an alkylation, an allylation, a benzylation, a silylation, an acylation, etc. as follows:

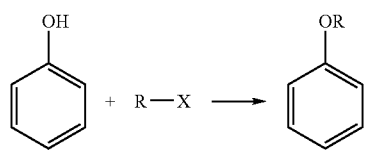

R is alkyl, allyl, benzyl, tetramethylsilane, acyl, etc.

X is I, Br, OTs (oxygen-toluene sulfonyl), etc.

Since water absorption causes a structural change such as shrinking or decomposition, forming a hydrophobic organic aerogel can prevent this structural change. Also, if the hydrophobic treatment is performed on the inside of the organic aerogel, it is possible to prevent the organic aerogel from decomposing even when deep cracks occur.

As described above, the organic aerogel may be formed using the composition including an aryl alcohol compound, an aldehyde compound, and a polyol compound. For example, the organic aerogel may be prepared by mixing an aryl alcohol compound, a catalyst, an aldehyde compound, and a polyol compound in an aqueous solution, preparing a wet gel by a sol-gel process, and drying the wet gel to thereby substitute the aqueous solution with a gas. If necessary, the organic aerogel preparation process may further include a process of solvent exchange during the drying of the wet gel.

The catalyst may include at least one selected from the group consisting of an acid catalyst, e.g., hydrochloric acid (HCl), hydrogen bromide (HBr), sulfuric acid (H$_2$SO$_4$), acetic acid, p-toluene sulfonic acid and combinations thereof; a base catalyst, e.g., sodium hydroxide (NaOH), sodium hydrogen carbonate (NaHCO$_3$), potassium hydroxide (KOH), potassium hydrogen carbonate (KHCO$_3$), ammonium hydroxide (NH$_4$OH), and combinations thereof.

Figure 1B:
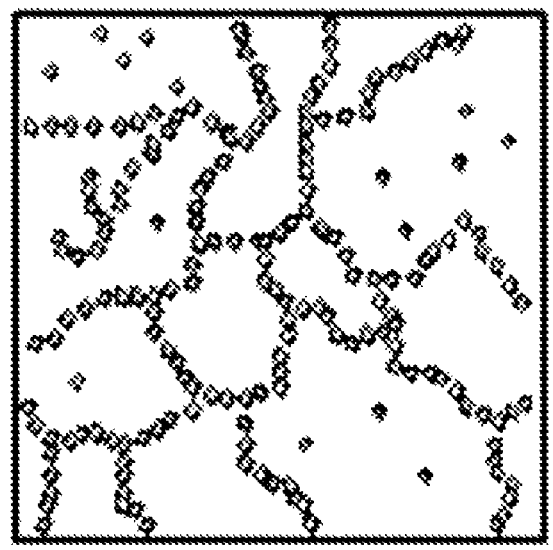
Figure 1C:
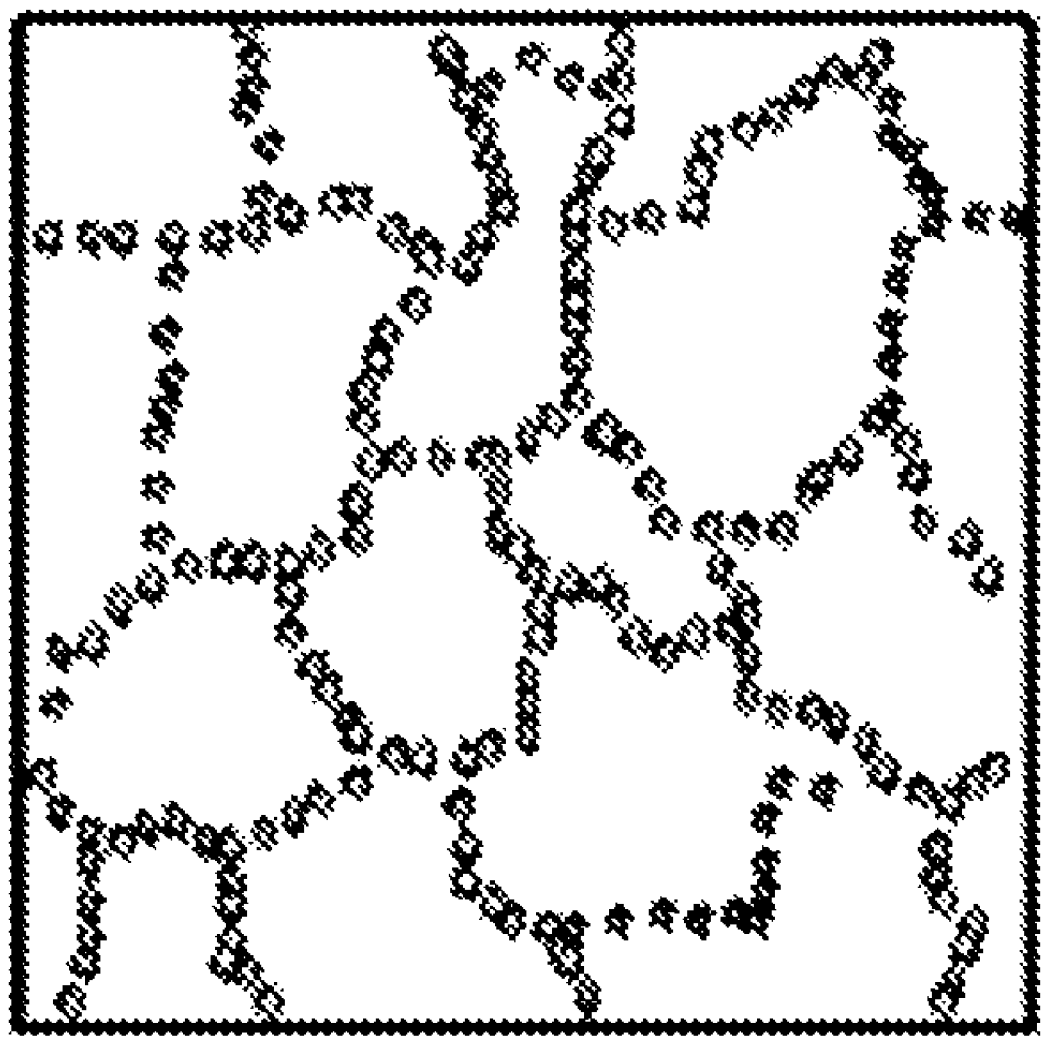

FIGS. 1A to 1C are schematic views showing a process of forming an organic aerogel through a sol-gel process.

FIG. 1A shows a sol state in which polymer particles with a diameter of about 1 μm or less are dispersed in a solution. The sol state including polymer particles with a diameter of about 1 μm or less is a colloid suspension in which the polymer particles are so small that the attraction between them or gravity can be ignored. Thus, Van der Waals force or a surface charge mainly applies and no precipitation occurs.

Referring to FIG. 1B, the sol state is transformed into a gel state in which the polymer particles are connected in three dimensions to confine the solvent. The transition into the gel state occurs based on such parameters as pH, temperature, and time, and is referred to as gellation. When the gel-state solvent is dried in a supercritical state, condensation based on the capillary phenomenon does not occur, a porous material without cracks is obtained. This is the aerogel shown in FIG. 1C.

Whether the gel is formed or not formed may be detected by whether the interface flows or does not flow when a mold including the reaction solution is slanted at an angle of about 90°.

The characteristics of the organic aerogel, such as density, may be controlled by changing the concentration of a reactant solution, including the mixture of the aryl alcohol compound, catalyst, aldehyde compound, and polyol compound in an aqueous solution. Particularly, the gellation time may be controlled based on the content of the polyol compound. Accordingly, the structure of the solid part of the organic aerogel may be changed. Herein, the polyol compound may be included in an amount of about 0.05 wt % to about 30 wt % based on the total weight of the aryl alcohol compound, the catalyst, the aldehyde compound, and the polyol compound. Within this range of the polyol compound, the organic aerogel has excellent flexibility and mechanical strength.

The wet gel prepared through the sol-gel process may be dried through a method selected from the group consisting of supercritical drying, atmospheric pressure drying, lyophilizing drying, lyophilizing reduced pressure drying, and combinations thereof. In one embodiment, the wet gel may be dried through supercritical drying with excellent performance.

The supercritical drying uses supercritical carbon dioxide instead of an organic solvent. Since this can simplify the process and the drying is performed at around room temperature, it is possible to reduce energy consumption and enhance safety.

When the liquid is evaporated in the wet gel, the vapor-liquid interface moves into the inside of the pores of the gel. When the sizes of the pores are different, different capillary tension is applied, and this may cause cracks in the gel. The capillary tension is affected by the size and internal area of the pores. Since there is no vapor-liquid interface inside the pores of the wet gel, the supercritical drying is free from the capillary tension and thus it can prevent cracks.

The supercritical drying of the wet gel is performed as follows. First, liquid carbon dioxide is supplied to remove the solution in a high-pressure reactor. When the solution is completely removed from the wet gel, the temperature and pressure of the high-pressure reactor are raised over the threshold points of carbon dioxide. While maintaining the temperature over the threshold temperature, the carbon dioxide is ejected to reduce the pressure.

The supercritical drying of the wet gel may further include a process of exchanging solvent. When the solution inside the wet gel is not compatible with carbon dioxide, the non-compatible solvent is exchanged for a solvent that is compatible with carbon dioxide, such as acetone. The exchange process occurs over a long period of time.

The atmospheric pressure drying method involves drying the wet gel through a heating process at atmospheric pressure or in a vacuum condition. When the solvent is removed through the atmospheric pressure drying method, the resultant product is called a xerogel. The xerogel may exhibit contraction in the gel structure due to capillary pressure.

Lyophilizing drying and lyophilizing reduced pressure drying are methods of removing the solvent by freezing the wet gel including an aqueous solution and reducing the pressure to sublimate ice. When the solvent is removed through the lyophilizing drying and lyophilizing reduced pressure drying, the resultant product is called cryogel.

Since the organic aerogel has mesopores, excellent mechanical strength, adiabatic properties, and flexibility, it may be used in diverse applications. For example, the organic aerogel may be used in a cooling device such as a refrigerator and freezer, it may be used as an adiabatic material for the aerospace industry, it may be applied to cryogenics storage such as for liquid natural gas (LNG) and freight vessels, it may be used as an adiabatic material for piping, buildings, and constructions, it may be used as an adiabatic fabric for clothing and shoes, it may be used as a catalyst carrier, and it may be used as a sound absorption material or a vibration reduction material.

Hereinafter, the present invention is illustrated in more detail with reference to examples. However, the examples are exemplary embodiments of the present invention and are not limiting.

Also, those skilled in the art would realize the described embodiments may be modified in various ways, all without departing from the spirit or scope of the disclosure.

Examples

Example 1

A polymer is prepared by adding 13 mL of acetonitrile to a 25 mL cylindrical polypropylene vial, further adding and dissolving 1.00 g of resorcinol, 0.8 mL of HCl (0.6 M acetonitrile solution), 1.5 mL of formalin (37 wt % aqueous solution), and 0.2 mL of pentaerythritol (15 wt % aqueous solution), and vigorously agitating the mixture solution. The polymer may include a structural unit represented by the following Chemical Formula 19, or a structural unit with another —C—O—C— coupling at least one between two hydroxy groups existing between aryl compounds in the following Chemical Formula 19 participating in a reaction. In addition to the structural unit of Chemical Formula 19, the polymer may further include a structural unit comprising an intermediate produced during the formation of the structural unit represented by the following Chemical Formula 19, and/or a structural unit produced as a result of lack of reaction with pentaerythritol.

Chemical Formula 19

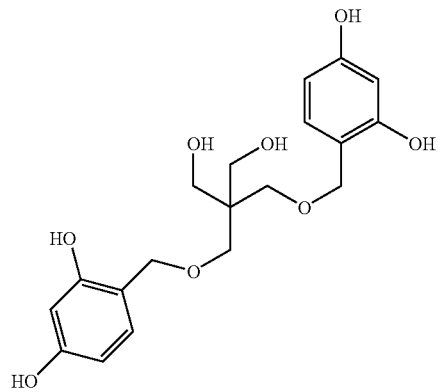

The polymer is produced through the following preparation of a wet gel. A compound of the structural unit represented by the Chemical Formula 19 is maintained at room temperature or in a heating condition, and when a gel is formed, the gel is aged in an oven at room temperature or about 60° C. for about 10 minutes to about 10 hours to thereby prepare a wet gel. Herein, the formation of the gel is detected by slanting a mold containing a reaction solution at 90° C. and determining if the interface flows or not.

An organic aerogel is prepared by drying the wet gel through a supercritical drying method. The solvent of the wet gel is exchanged with acetone. During the supercritical drying, the acetone is removed from a high-pressure reactor by supplying liquid carbon dioxide thereto. When the acetone is completely removed from the wet gel, the temperature and pressure are raised over the threshold points of carbon dioxide. Then, the carbon dioxide is slowly ejected to reduce the pressure while maintaining the temperature at over the threshold temperature.

Example 2

An organic aerogel is prepared according to the same process as Example 1, except that a polymer is prepared by adding dipentaerythritol (15 wt % aqueous solution) instead of pentaerythritol. The prepared polymer may include a structural unit represented by the following Chemical Formula 20, or a structural unit with another —C—O—C— coupling at least one among four hydroxy groups existing among aryl compounds of the following Chemical Formula 20 participating in a reaction. In addition to the structural unit of Chemical Formula 20, the polymer may further include an intermediate produced during the formation of the structural unit represented by the following Chemical Formula 20, and/or a structural unit produced as a result of lack of reaction with dipentaerythritol.

Chemical Formula 20

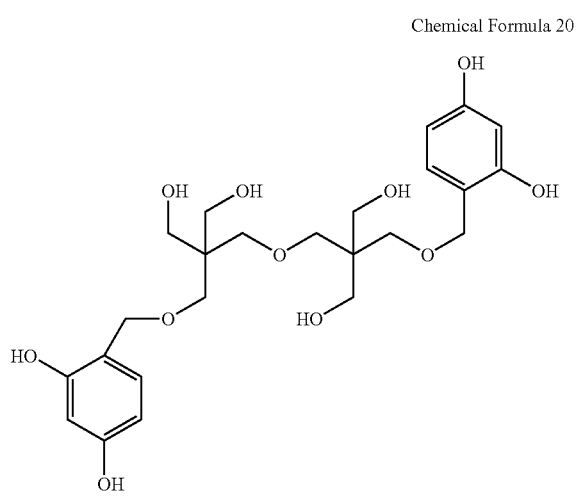

Example 3

An organic aerogel is prepared according to the same process as Example 1, except that a polymer is prepared by adding a solution obtained by dissolving tris(2-hydroxyethyl) isocyanurate in a dimethyl formamide (DMF) solvent, instead of the pentaerythritol aqueous solution. The prepared polymer may include a structural unit represented by the following Chemical Formula 21, or a structural unit with another —C—O—C— coupling between aryl compounds of the following Chemical Formula 21 participating in a reaction. In addition to the structural unit of Chemical Formula 21, the polymer may further include an intermediate produced during the formation of the structural unit represented by the following Chemical Formula 21, and/or include a structural unit produced as a result of lack of reaction with tris(2-hydroxyethyl)isocyanurate.

Chemical Formula 21

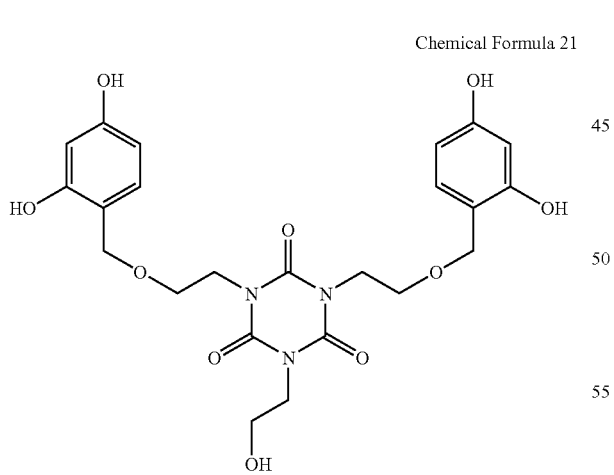

Example 4

An organic aerogel is prepared according to the same process as Example 1, except that a polymer is prepared by adding a solution obtained by dissolving 2,2,6,6-tetrakis(hydroxymethyl)cyclohexanol in a dimethyl formamide (DMF) solvent, instead of the pentaerythritol aqueous solution. The prepared polymer may include a structural unit represented by the following Chemical Formula 22, or a structural unit with another —C—O—C— coupling at least one among three hydroxy groups existing among aryl compounds of the following Chemical Formula 22 participating in a reaction. In addition to the structural unit of Chemical Formula 22, the polymer may further include an intermediate produced during the formation of the structural unit represented by the following Chemical Formula 22, and/or a structural unit produced as a result of lack of reaction with 2,2,6,6-tetrakis(hydroxymethyl)cyclohexanol.

Chemical Formula 22

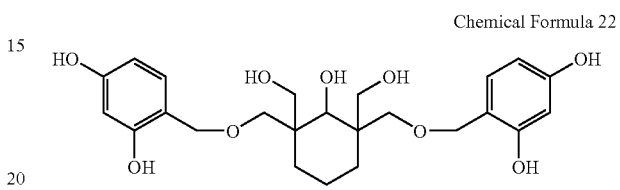

Comparative Example 1

An organic aerogel is prepared according to the same process as Example 1, except that a polymer is prepared without pentaerythritol added thereto. The prepared polymer may include a structural unit represented by the following Chemical Formula 23, a structural unit represented by the following Chemical Formula 24, or both.

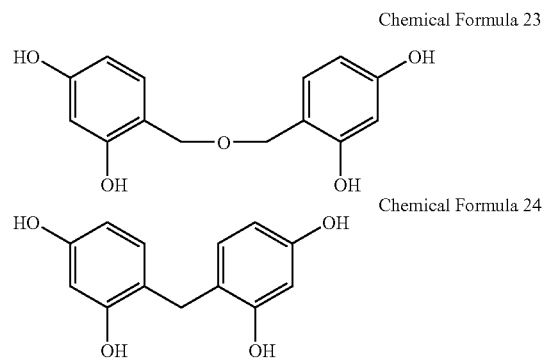

Experimental Example

Experimental Example 1

NMR Analysis of Organic Aerogel

Figure 2:
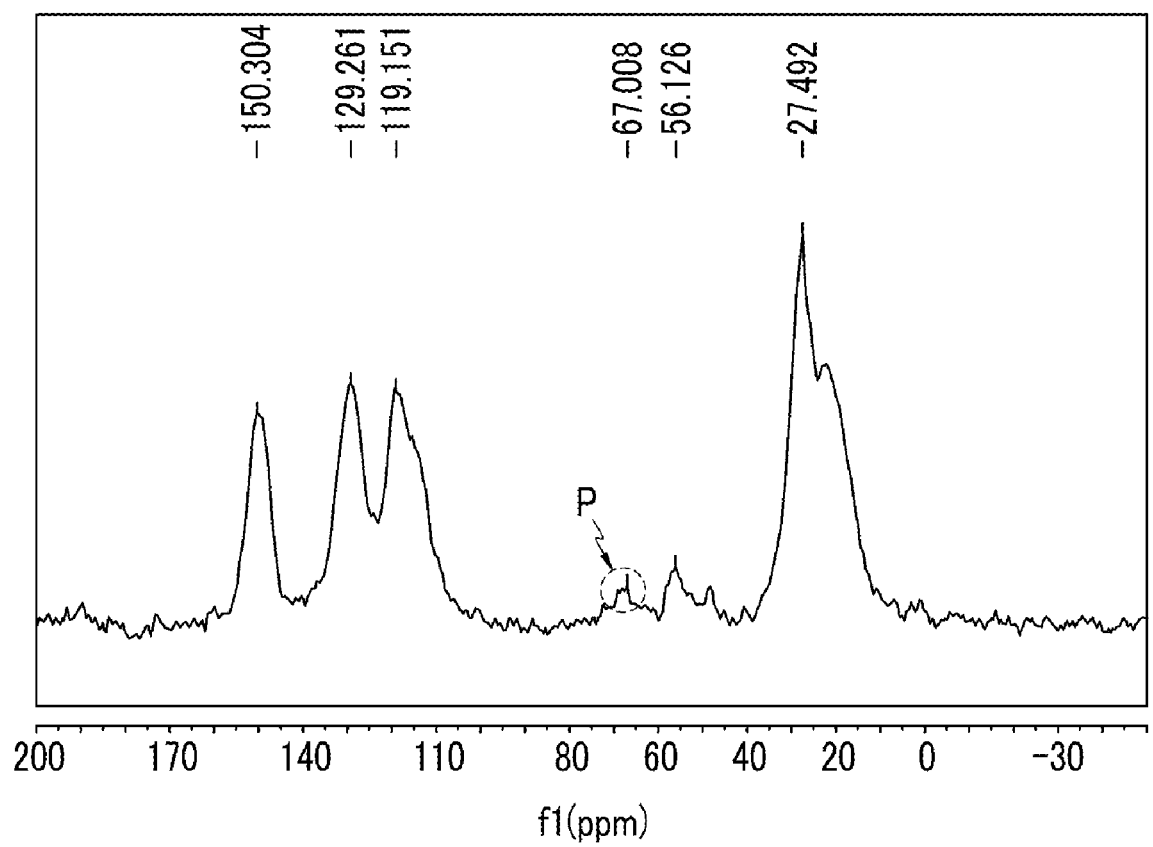
FIG. 2 is a $^{13}C$ Cross-Polarization/Magic-Angle-Spinning ("CP/MAS") nuclear magnetic resonance ("NMR") analysis graph of an organic aerogel prepared according to Example 1.
Figure 3:
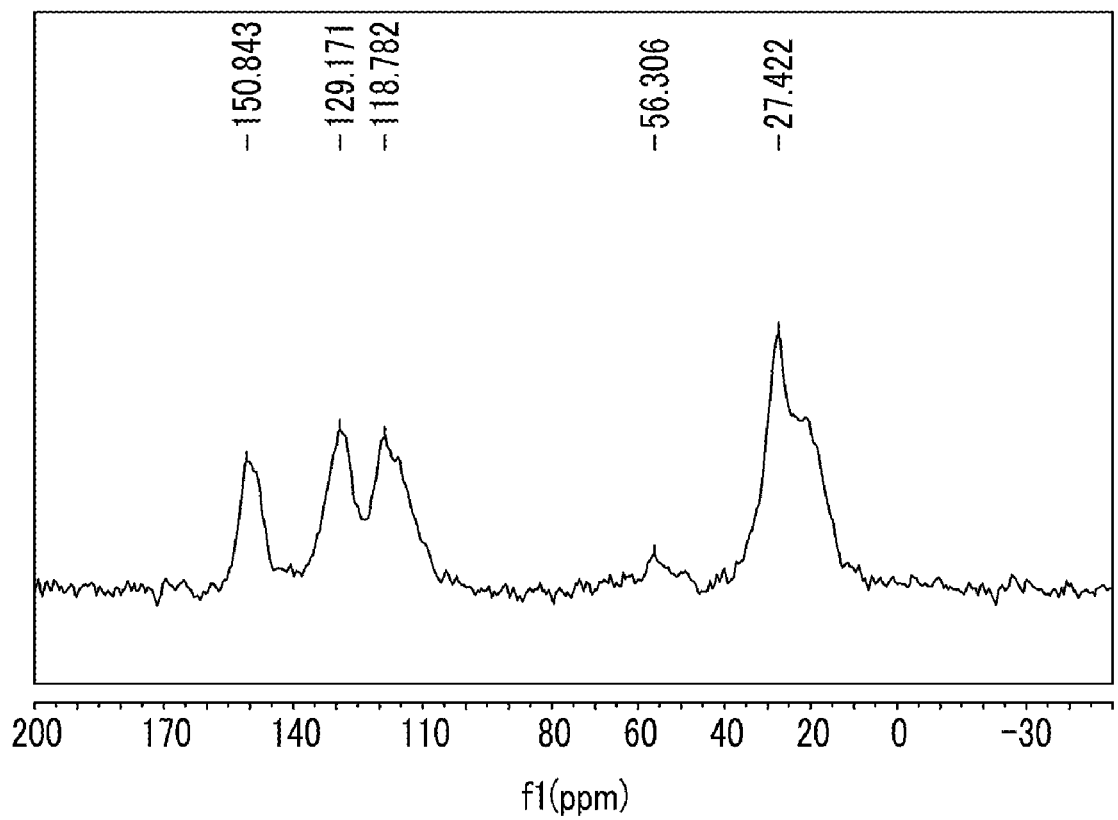
FIG. 3 is a $^{13}C$ CP/MAS NMR analysis graph of an organic aerogel prepared according to Comparative Example 1.
Figure 4:
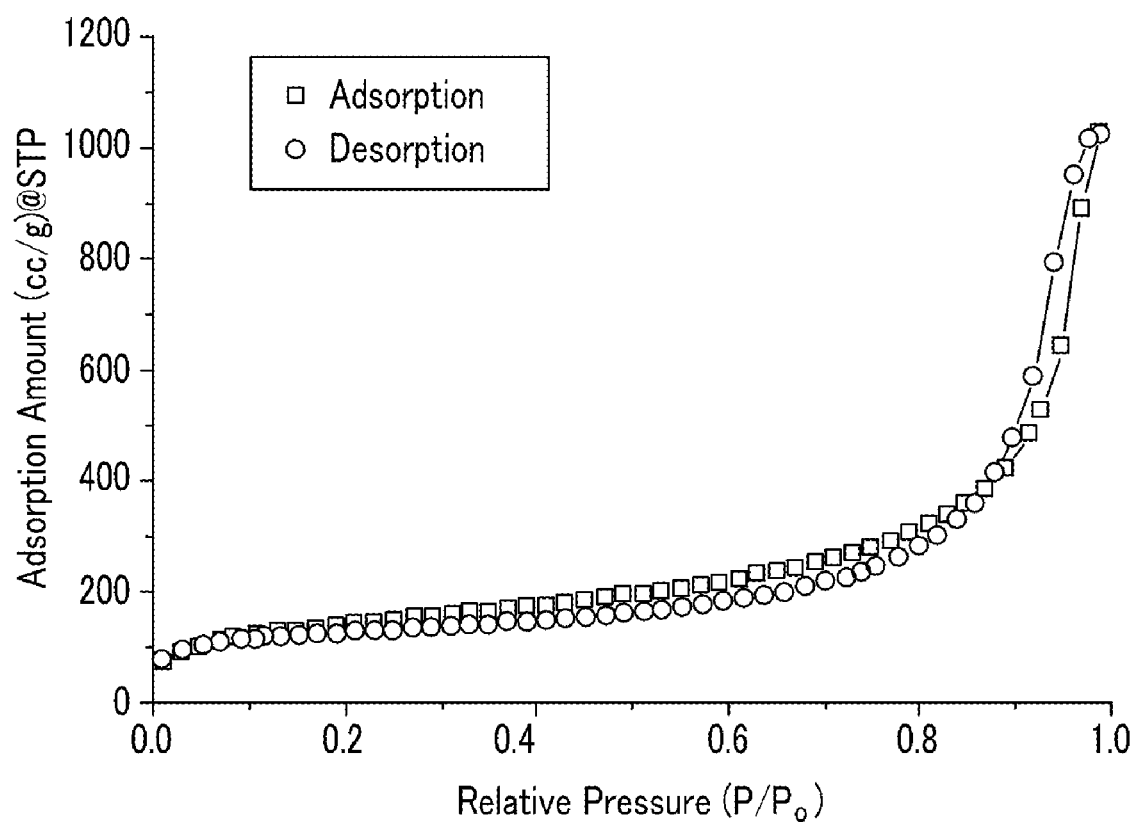
FIGS. 4 to 7 are graphs showing nitrogen ($N_2$) adsorption-desorption isotherms of organic aerogels prepared according to Examples 1 to 4.
Figure 5:
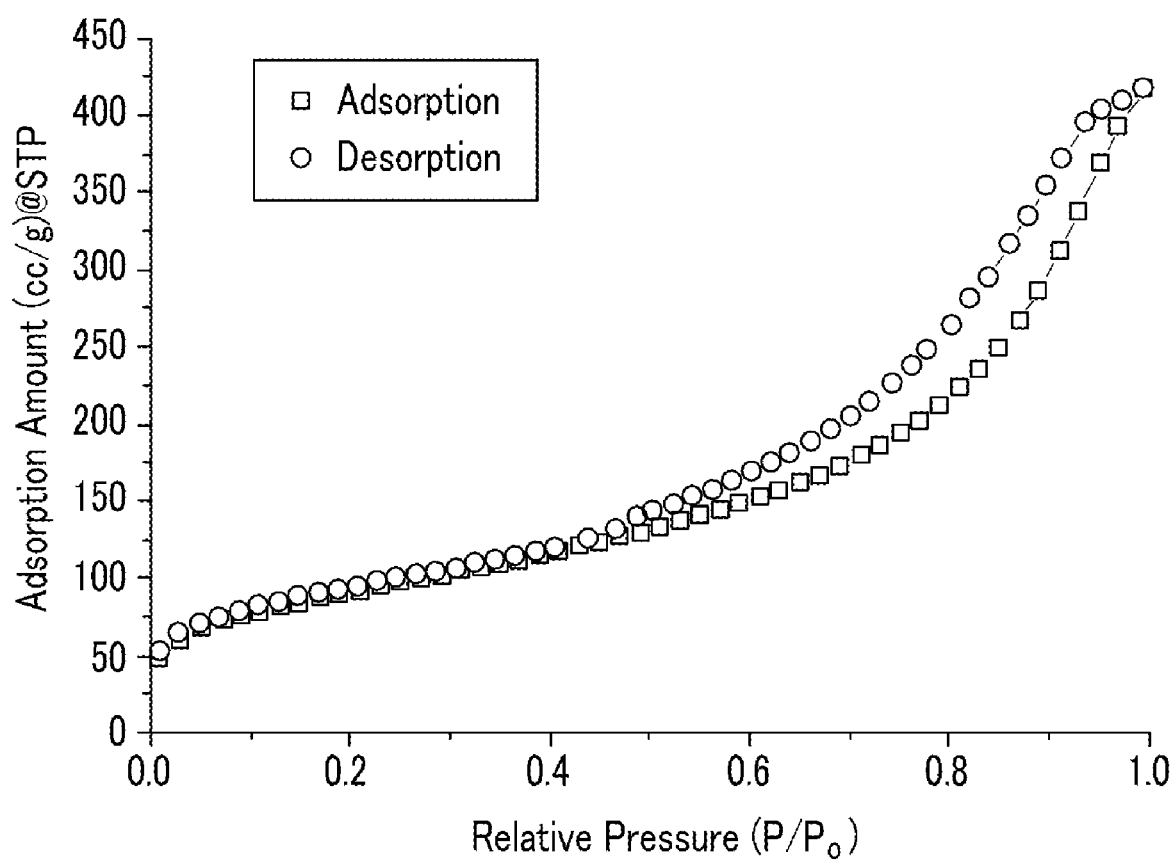
Figure 6:
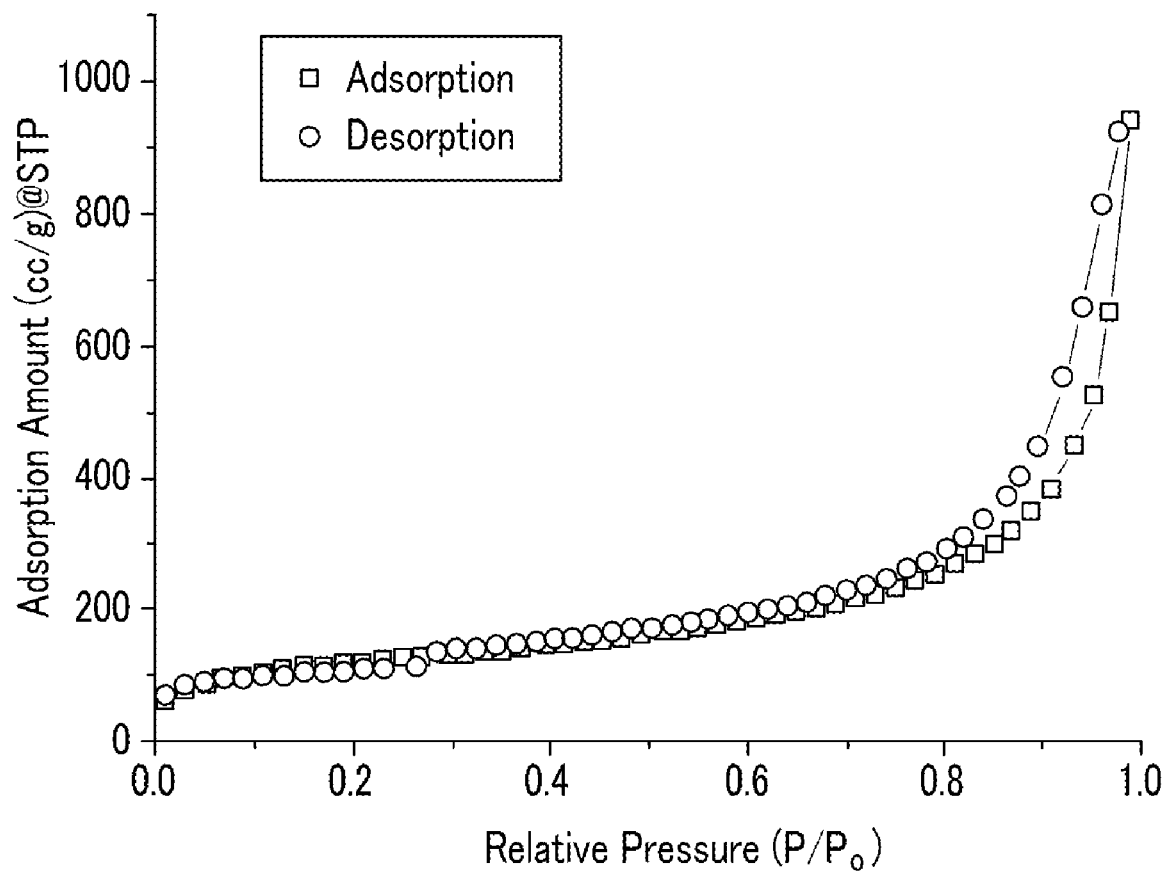
Figure 7:
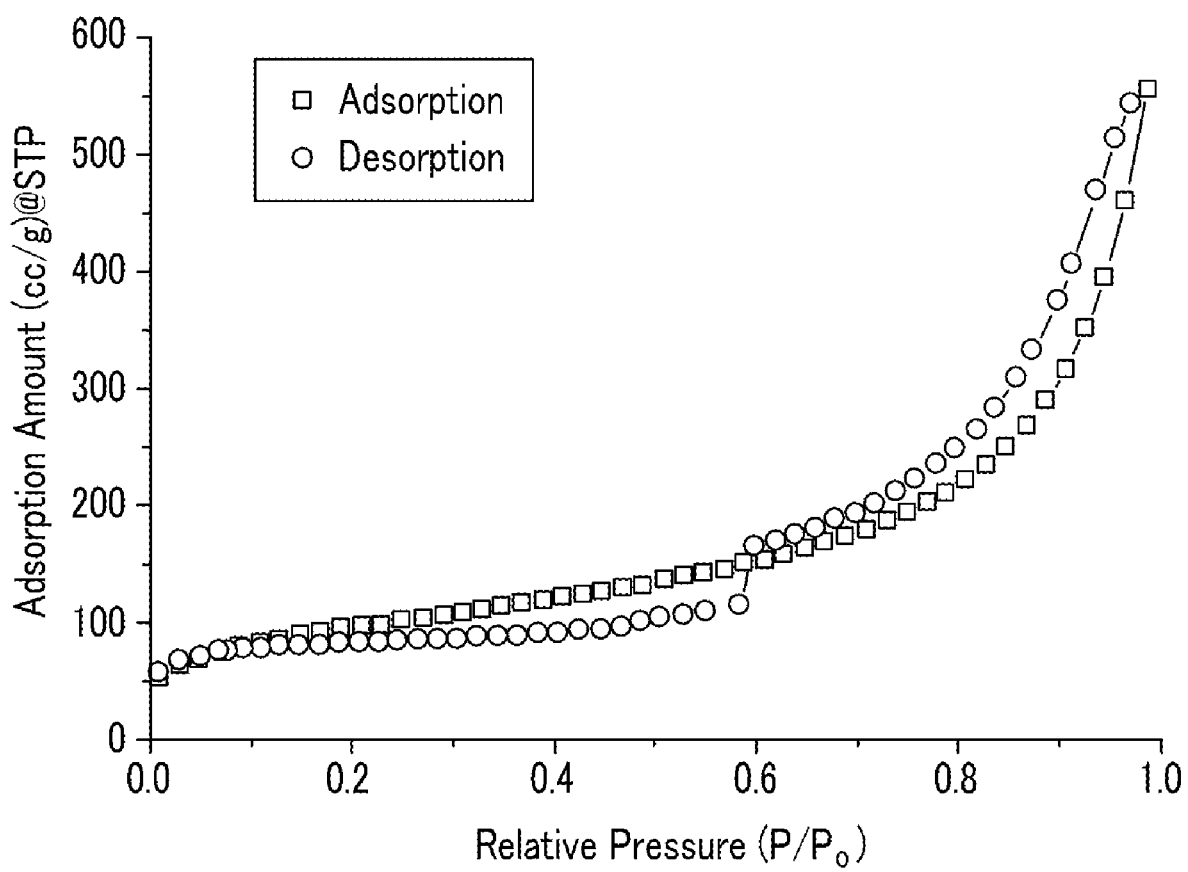

The organic aerogels prepared according to Example 1 and the Comparative Example 1 undergo $^{13}$C Cross-Polarization/Magic-Angle-Spinning (CP/MAS) nuclear magnetic resonance (NMR) analysis, and the analysis results are represented in FIGS. 2 and 3, respectively. The NMR analysis is performed using Bruker NMR 600 MHz (AVANCE III) in 13C CP MAS (SS 15k) for a contact time of 3000 µs.

FIG. 2 is an $^{13}$C CP/MAS NMR analysis graph of the organic aerogel prepared according to Example 1, and FIG. 3 is a $^{13}$C CP/MAS NMR analysis graph of the organic aerogel prepared according to Comparative Example 1.

The horizontal axis f1 represents a frequency domain with respect to a time axis in FIGS. 2 and 3. Referring to FIGS. 2 and 3, a peak (P) of a quaternary carbon is observed at about 67 ppm in the organic aerogel of Example 1 where a polyol compound of pentaerythritol is added for reaction, but is not observed in the organic aerogel of Comparative Example 1 where no polyol compound is added. The quaternary carbon exists in a part formed from pentaerythritol in the Chemical Formula 19, and this result shows that the prepared organic aerogel includes a new linking group formed from the polyol compound.

Experimental Example 2

$N_2$ Adsorption-Desorption Isotherm Analysis of Organic Aerogel

Figure 8:
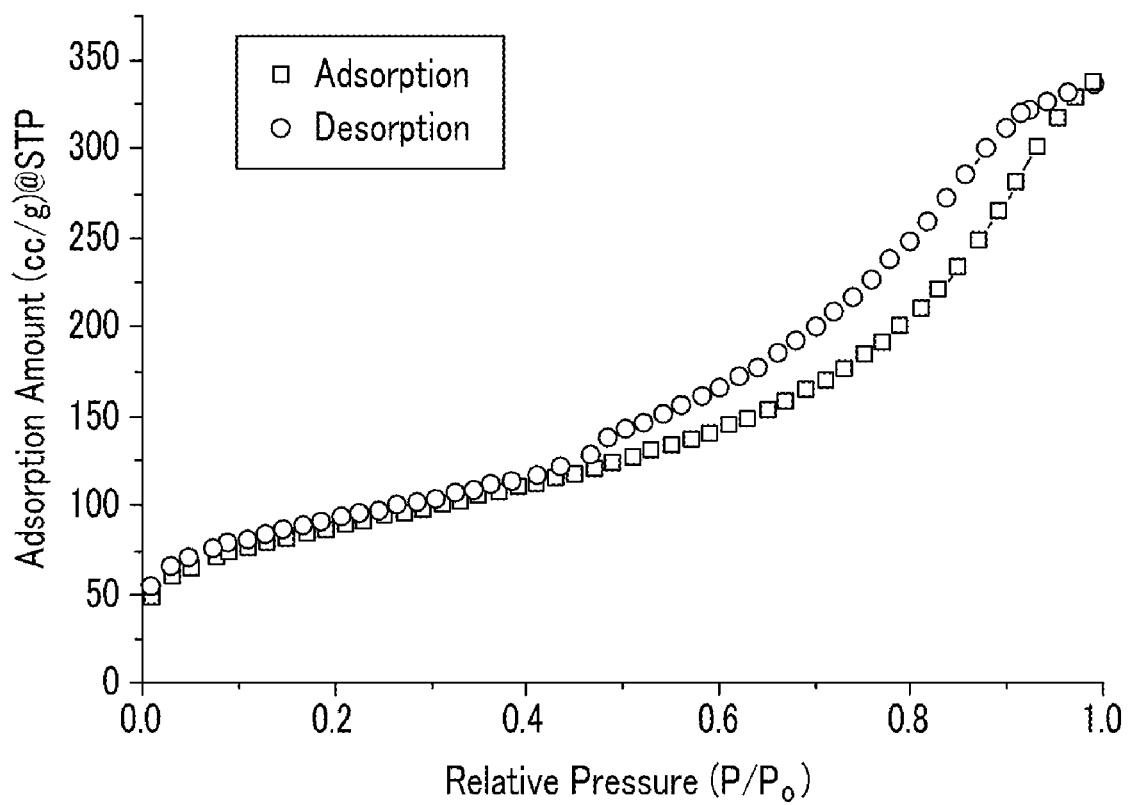
FIG. 8 is a graph showing a nitrogen ($N_2$) adsorption-desorption isotherm of an organic aerogel prepared according to Comparative Example 1.
Figure 9:
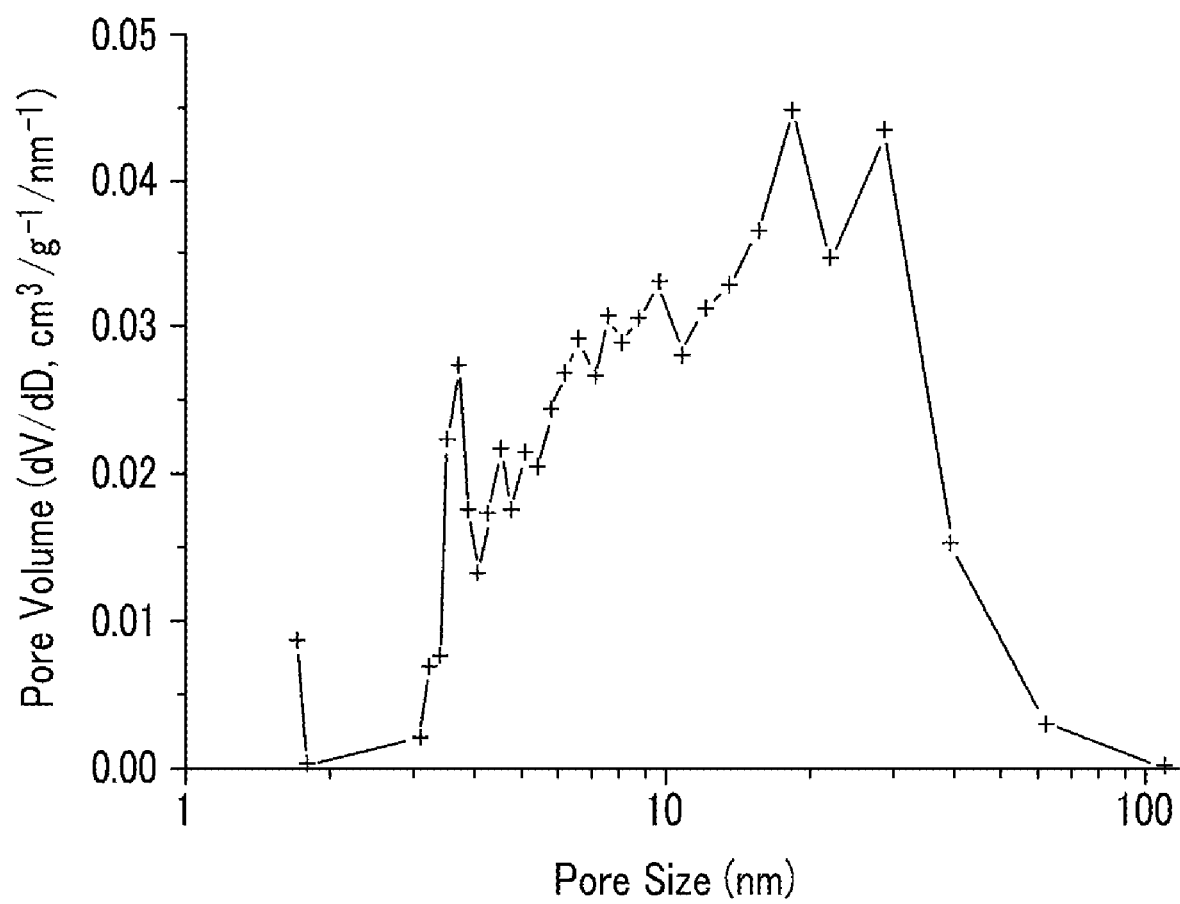
FIGS. 9 to 12 are graphs showing pore size distributions calculated based on Barrett-Joyner-Hatenda ("BJH") desorption isotherms of organic aerogels prepared according to Examples 1 to 4.
Figure 10:
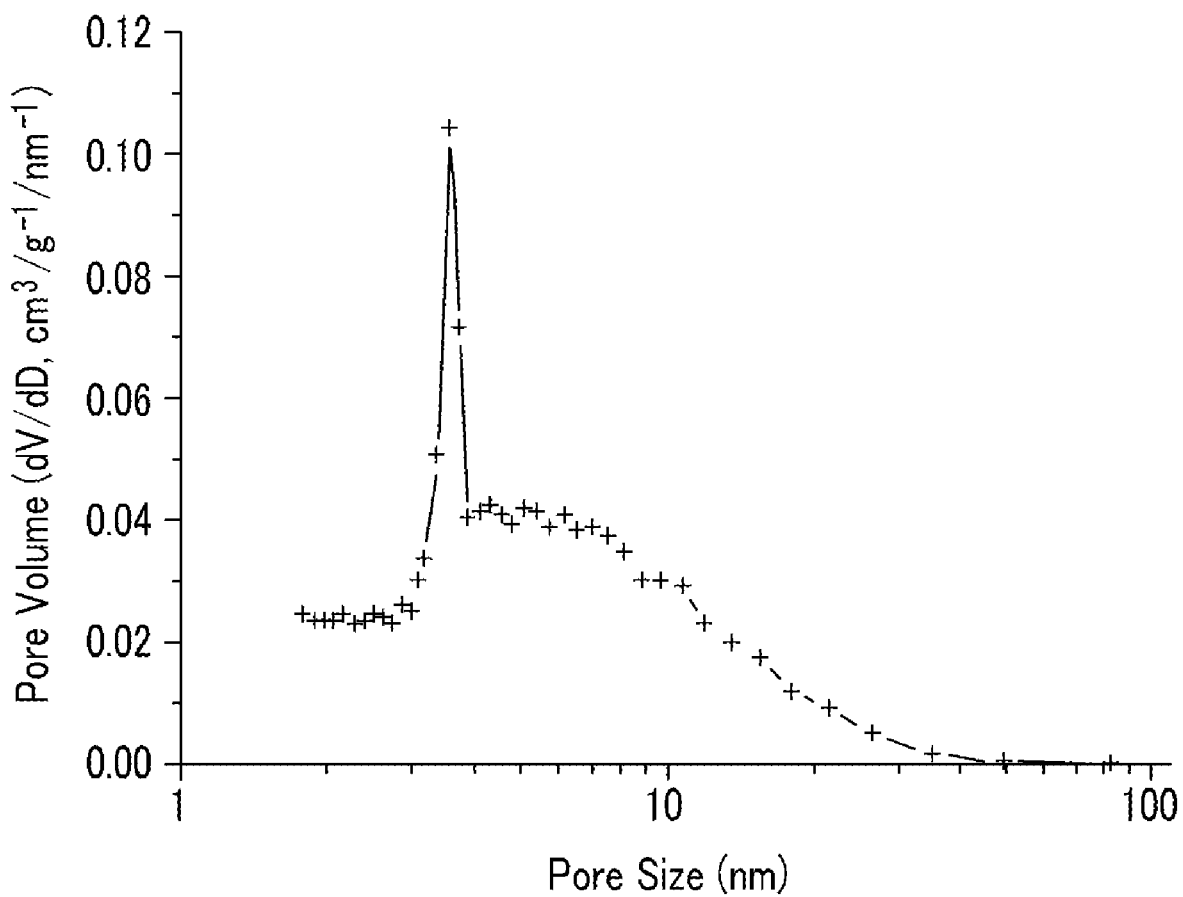
Figure 11:
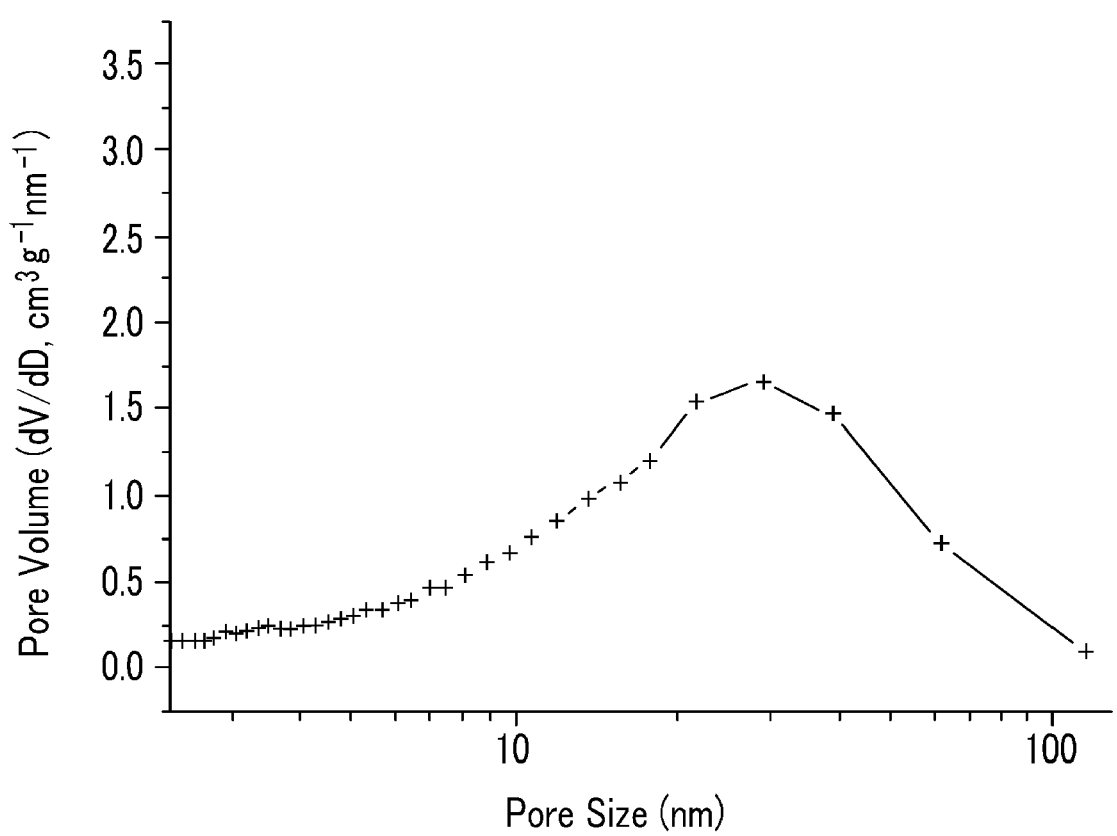
Figure 12:
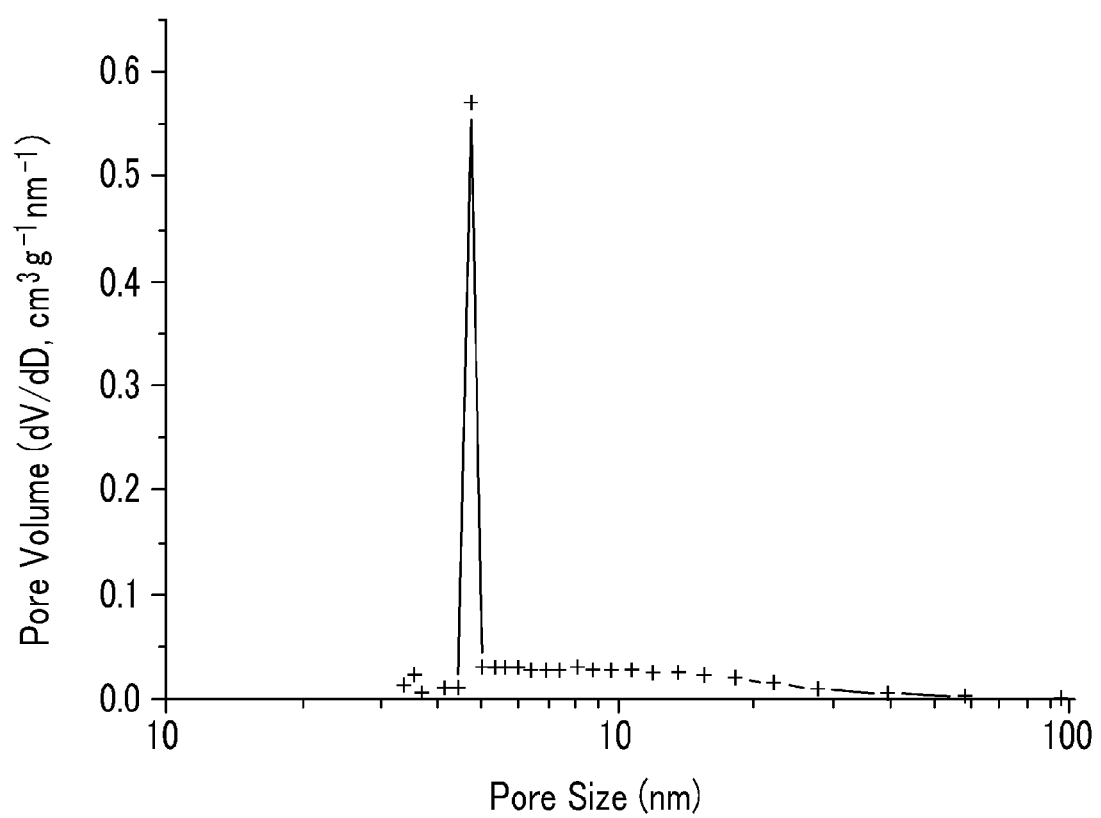

FIGS. 4 to 7 show nitrogen adsorption-desorption isotherm graphs of organic aerogels according to Examples 1 to 4, and FIG. 8 shows a nitrogen adsorption-desorption isotherm graph of the organic aerogel according to Comparative Example 1. FIGS. 4 to 7 show the adsorption-desorption characteristics of the organic aerogels prepared according to Examples 1 to 4, respectively.

The graphs of FIGS. 4 to 7 show that the adsorption or desorption amount changes according to a variation of pressure. Accordingly, it can be seen from the graphs that organic aerogels with mesopores are prepared.

Experimental Example 3

Density Measurement of Organic Aerogel

The densities of the organic aerogels prepared according to Examples 1 to 4 and Comparative Example 1 are measured, and the density measurement results are shown in the following Table 1. The densities are calculated by obtaining the total weight of resorcinol, formalin, and the polyol compound based on the volume of acetone and water.

The following Table 1 shows that the organic aerogels have very low density ranging from about 0.003 g/cm$^3$ to about 0.35 g/cm$^3$.

Experimental Example 4

Measurement of Specific Surface Area of Organic Aerogel

The specific surface areas of the organic aerogels prepared according to Examples 1 to 4 and Comparative Example are measured, and the results are shown in the following Table 1. The specific surface areas are measured using a surface area analyzer TriStar3020 (produced by Micromeritics Instruments, USA) at 77K.

The following Table 1 shows that the organic aerogels have a specific surface area ranging from about 250 m$^2$/g to about 800 m$^2$/g.

Experimental Example 5

Measurement of Pore Size of Organic Aerogel

Figure 13:
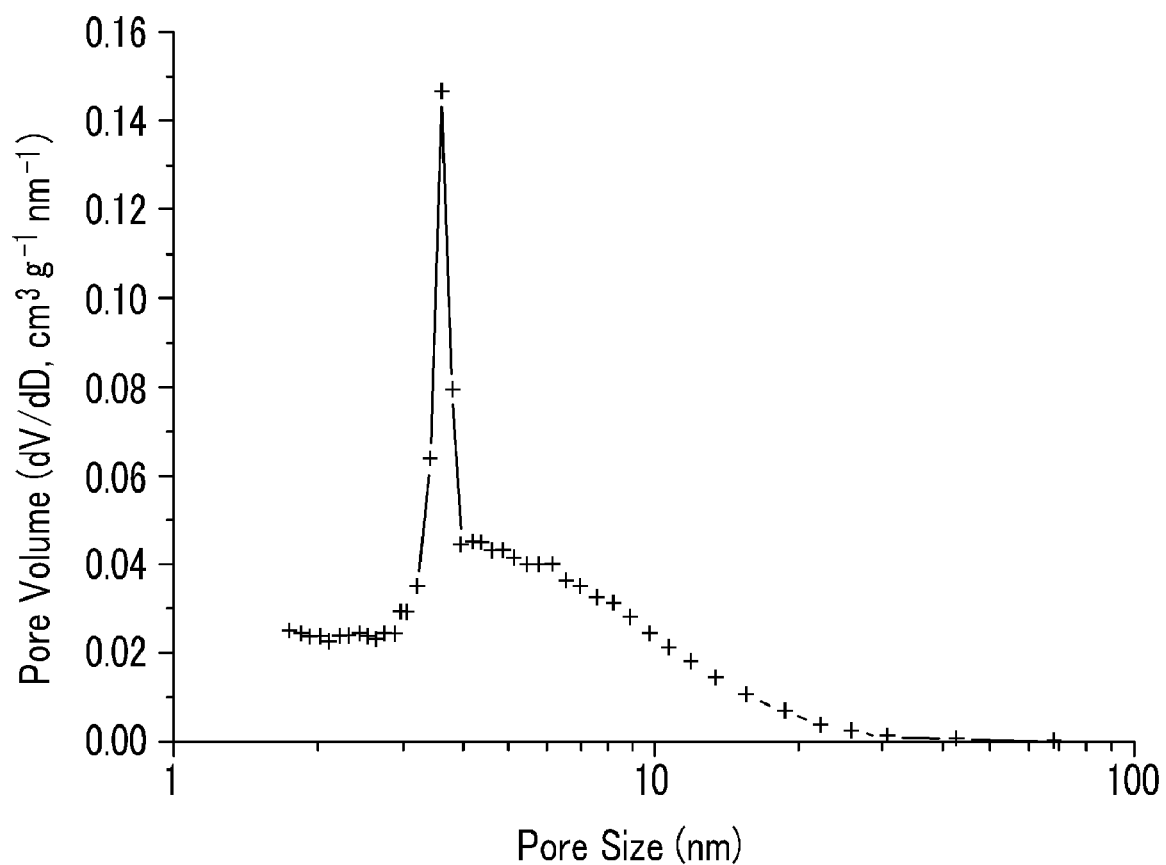
FIG. 13 is a graph showing a pore size distribution calculated based on the BJH desorption isotherm of the organic aerogel prepared according to Comparative Example 1.

The pore sizes of the organic aerogels prepared according to Examples 1 to 4 and Comparative Example 1 are measured and are shown in FIGS. 9 to 13, respectively. Their average pore size is as shown in Table 1. FIGS. 9 to 12 are graphs showing distribution of pore sizes calculated based on the BJH desorption isotherms of the organic aerogels prepared according to above Examples 1 to 4, respectively, and FIG. 13 is a graph showing distribution of pore sizes calculated based on the desorption isotherm of the organic aerogel prepared according to Comparative Example 1. It can be seen from the graphs that the prepared organic aerogels have fine mesopores.

Experimental Example 6

Measurement of Heat Conductivity of Organic Aerogel

Heat conductivities of the organic aerogels prepared according to Examples 1 to 4 and Comparative Example 1 are measured, and the results are shown in the following Table 1. The heat conductivities are measured using a Mathis TCi thermal conductivity tester based on a modified hot-wire method.

The following Table 1 shows that the organic aerogels of Examples 1 to 4, which are prepared by adding a polyol compound to the reaction of an aryl alcohol compound and an aldehyde compound, have an improved adiabatic property in comparison to the organic aerogel of Comparative Example 1, which is prepared without adding a polyol compound, because the heat conductivities of the organic aerogels of Examples 1 to 4 are lower.

TABLE 1

| | Example 1 | Example 2 | Example 3 | Example 4 | Comparative Example 1 |
|---|---|---|---|---|---|
| Density (g/mL) | 0.30 | 0.25 | 0.23 | 0.25 | 0.33 |
| Specific surface area (m$^2$/g) | 493 | 323 | 414 | 339 | 312 |
| Pore size (nm) | 18.2 | 7.5 | 12.1 | 11 | 6.3 |
| Thermal conductivity (mW/m · K) | 23.1 | 17.0 | 20.5 | 19.4 | 24.5 |

While the present invention has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:
1. An organic aerogel comprising a polymer obtained from reaction of an aryl alcohol compound, an aldehyde compound, and a polyol compound.
2. The aerogel of claim 1, wherein the polymer comprises a structural unit represented by the following Chemical Formula 1:

$$R\text{-}(O\text{-}A)_n \qquad \text{Chemical Formula 1}$$

wherein, in the above Chemical Formula 1,
R is selected from the group consisting of a substituted or unsubstituted, alkylene, substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted, heterocycloalkynylene, a substituted or unsubstituted arylene, and a substituted or unsubstituted heteroarylene, A is hydrogen, and/or a structural unit represented by the following Chemical Formula 2, provided that each A is the same or different, and that at least one A is not hydrogen, and n is an integer ranging from 2 to 10,

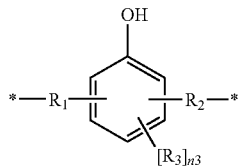

Chemical Formula 2 wherein, in the above Chemical Formula 2, $R_1$ and $R_2$ are independently selected from the group consisting of hydrogen, a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted, cycloalkynylene, a substituted, or unsubstituted heterocycloalkylene, a substituted or unsubstituted heterocycloalkenylene, substituted or unsubstituted heterocycloalkynylene, a substituted or unsubstituted arylene, and a substituted or unsubstituted heteroarylene, $R_3$ is selected from the group consisting of hydrogen, a hydroxy, a substituted or unsubstituted alkoxy, and a substituted or unsubstituted amino, and n3 is an integer ranging from 0 to 3.

3. The organic aerogel of claim 1, wherein the polyol compound is represented by the following Chemical Formula 3:

Chemical Formula 3 wherein, in the above Chemical Formula 3, $R_9$ is selected from the group consisting of a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, and n9 is an integer ranging from 2 to 10.

4. The organic aerogel of claim 2, wherein the polymer further comprises a structural unit represented by the following Chemical Formula 13:

Chemical Formula 13 wherein, in the above Chemical Formula 13, $R_4$ is selected from the group consisting of a substituted or unsubstituted alkylene, a substituted or unsubstituted alkenylene, a substituted or unsubstituted alkynylene, a substituted or unsubstituted cycloalkylene a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, B is hydrogen, and/or a structural unit represented by the following Chemical Formula 14, provided that each B is the same or different, and that at least one B is not hydrogen, and n4 is an integer ranging from 2 to 4,

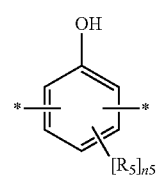

Chemical Formula 14 wherein, in the above Chemical Formula 14, $R_5$ is selected from the group consisting of hydrogen, a hydroxy, a substituted or unsubstituted alkoxy, and a substituted or unsubstituted amino, and n5 is an integer ranging from 0 to 3.

5. The organic aerogel of claim 2, wherein the polymer further comprises a structural unit represented by the following Chemical Formula 16:

Chemical Formula 16 wherein, in the above Chemical Formula 16,

D is hydrogen, and/or a structural unit represented by the following Chemical Formula 17, provided that each D is the same or different, and that at least one D is not hydrogen, and n6 is an integer of 2,

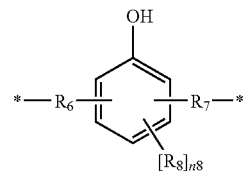

Chemical Formula 17 wherein, in the above Chemical Formula 17, $R_6$ and $R_7$ are independently selected from the group consisting of hydrogen, a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, substituted or unsubstituted heterocycloalkynylene, a substituted or unsubstituted arylene, and a substituted or unsubstituted heteroarylene, $R_8$ is selected from the group consisting of hydrogen, a hydroxy, a substituted or unsubstituted alkoxy, and a substituted or unsubstituted amino, and n8 is an integer ranging from 0 to 3.

6. The organic aerogel of claim 1, wherein the polyol compound is present in an amount of about 0.05 to about 30 wt % based on the summed weight of the aryl alcohol compound, the aldehyde compound, and the polyol compound.

7. A method of preparing an organic aerogel, comprising mixing an aryl alcohol compound, an aldehyde compound, and a polyol compound to make a wet gel, and drying the wet gel.

8. The method of claim 7, wherein the polyol compound is represented by the following Chemical Formula 3:

$$R_9\text{-}(OH)_{n9} \qquad \text{Chemical Formula 3}$$

wherein, in the above Chemical Formula 3, $R_9$ is selected from the group consisting of a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted heterocycloalkylene, a substituted or unsubstituted heterocycloalkenylene, a substituted or unsubstituted heterocycloalkynylene, a substituted or unsubstituted arylene, and a substituted or unsubstituted heteroarylene, and n9 is an integer ranging from 2 to 10.

9. The method of claim 7, wherein the drying a wet gel is preformed using a sol-gel process.

10. The method of claim 7, wherein the drying a wet gel comprises a solvent exchange process.

11. The method of claim 7, wherein drying a wet gel is preformed using at least one method selected from supercritical drying, atmospheric pressure drying, lyophilizing drying, and lyophilizing reduced pressure drying.

12. The method of claim 7, wherein the mixing is conducted in the presence of an acid catalyst or a base catalyst and an acid catalyst.

13. The aerogel of claim 1, wherein the aerogel has a specific surface area from about 250 m²/g to about 800 m²g.

14. The aerogel of claim 1, wherein the aerogel has a porosity from about 80 vol. % to about 99 vol. %.

15. The aerogel of claim 1, wherein the aerogel has a pore size from about 1 nm to about 50 nm.

16. The aerogel of claim 1, wherein the aerogel has a density from about 0.003 g/μm³ to about 0.35 g/cm³.

17. The aerogel of claim 1, wherein the aerogel has a thermal conductivity of about 24 mW/m·K or less.

* * * * *